C. F. FELLOWS.
FRUIT PICKER.
APPLICATION FILED JAN. 24, 1911.
1,013,144.
Patented Jan. 2, 1912.
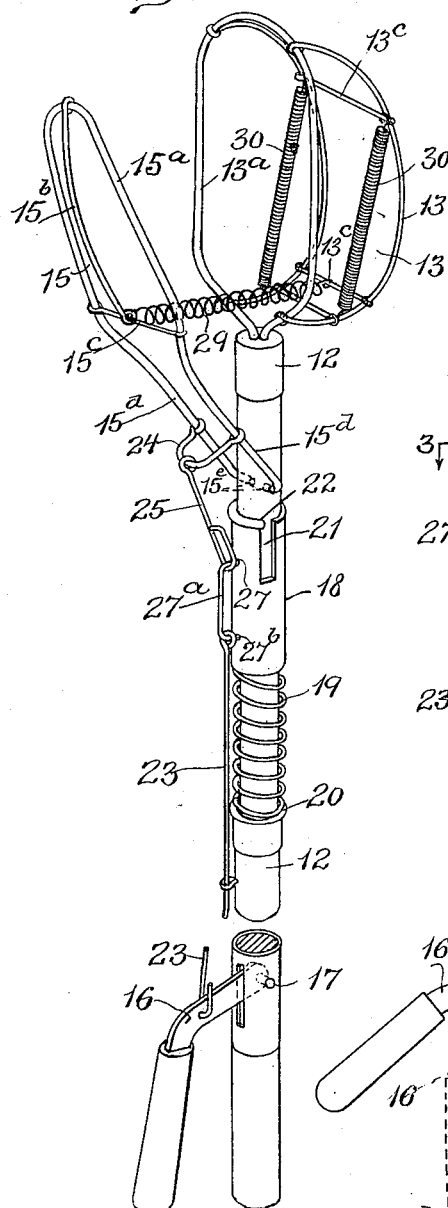
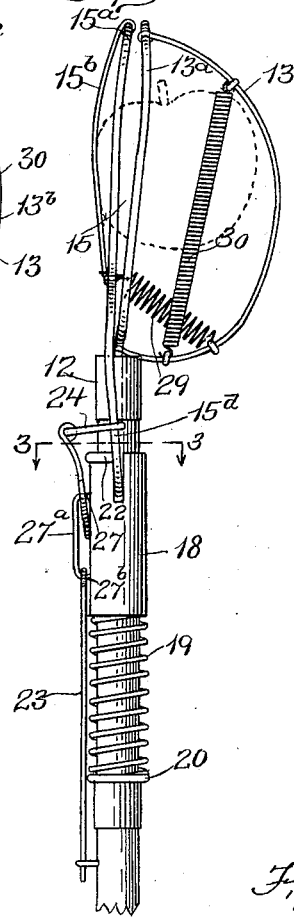
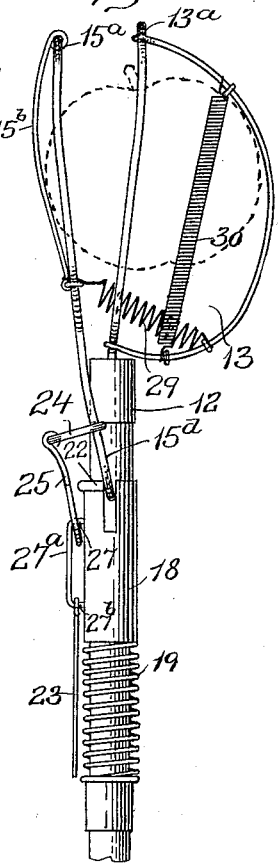
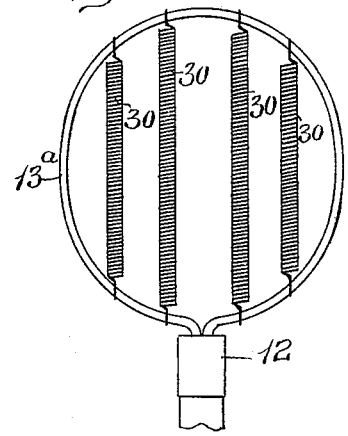
Witnesses:
Inventor:
Charles F. Fellows
Attys.

UNITED STATES PATENT OFFICE.

CHARLES F. FELLOWS, OF WEST CHELMSFORD, MASSACHUSETTS, ASSIGNOR OF ONE-HALF TO PERLIE A. DYAR, OF BOSTON, MASSACHUSETTS.

FRUIT-PICKER.

1,013,144.     Specification of Letters Patent.     Patented Jan. 2, 1912.

Application filed January 24, 1911. Serial No. 604,397.

*To all whom it may concern:*

Be it known that I, CHARLES F. FELLOWS, of West Chelmsford, in the county of Middlesex and State of Massachusetts, have invented certain new and useful Improvements in Fruit-Pickers, of which the following is a specification.

This invention relates to a fruit picker having opposed jaws mounted on one end of an elongated rod or handle and operable from the opposite end to engage a fruit and transport the same to a receptacle, the jaws being formed to constitute a clamp adapted to be closed upon a fruit to detach it from the tree and to be opened to discharge the fruit.

The invention has for its object, first, to permit the jaws to be closed upon the fruit and grasp the same so that the fruit may be partially rotated to break the stem by twisting it, and to be automatically locked while grasping the fruit until they are in the desired position for discharging the fruit; secondly, to enable the jaws to engage and securely hold a fruit which is too large to permit the complete closing of the jaws, and, thirdly, to provide means for yieldingly grasping soft fruits, such as pears or peaches, and prevent abrasion of the same during the operation of picking.

The invention consists in the improvements which I will now proceed to describe and claim.

Of the accompanying drawings forming a part of this specification,—Figure 1 represents a perspective view of a fruit picker embodying my invention, the jaws being separated to engage a fruit. Fig. 2 represents a side elevation of the same showing the jaws closed and locked to confine a fruit. Fig. 3 represents a section on line 3—3 of Fig. 2. Fig. 4 represents a view similar to a portion of Fig. 2 showing the jaws partially closed to confine a relatively large fruit. Fig. 5 represents a front view of a modified form of the fixed jaw.

The same reference characters indicate the same parts in all the figures.

Of the drawings,—12 represents an elongated rod or handle, on the upper end portion of which a pair of fruit-engaging jaws are mounted for relative fruit-grasping and releasing movements. One of the jaws is preferably fixed on the handle and the other hinged thereto and movable toward and from the fixed jaw.

In the embodiment of my invention here shown, 13 represents the fixed jaw which is formed as a receptacle or basket, adapted to receive a fruit, or the greater part thereof. The jaw 13 may be of any suitable construction and is here shown as composed of a marginal wire frame member $13^a$, the ends of which form a shank inserted in the outer end of the handle, and wire back members $13^b$ attached to the frame member and connected by braces $13^c$, the whole forming a basket adapted to receive the greater part of the fruit, as shown by Figs. 2 and 4.

15 represents the hinged jaw, which, as here shown, is composed of a wire frame member $15^a$ and a wire back member $15^b$ attached at one end to the member $15^a$ and at its other end to a brace $15^c$. The end portions $15^d$ of the wire member $15^a$ are extended on opposite sides of the handle 12 and are bent inwardly to form hinge pintles or ears $15^e$ adapted to turn in sockets formed for their reception in the handle 12.

16 represents an operating lever which is hinged at 17 to the inner end portion of the handle 12.

18 represents a sleeve which is movable on the outer portion of the handle and is normally projected or pressed upward by a spring 19 bearing at one end on said sleeve and at the opposite end on a fixed collar 20 on the handle. The sleeve 18 is provided with slots 21 at its upper end in its opposite sides and with a segmental enlargement at its upper end, the ends of said enlargement forming shoulders or stops 22 adapted to bear against the end portions $15^d$, as shown by Figs. 2, 3, and 4, for the purpose of locking the jaw 15 against fruit-releasing movement, as hereinafter described.

23 represents a rod which is connected at one end with a lever 16 and at the opposite end with the sleeve 18, so that, when the lever is moved from the position shown by full lines in Fig. 2 to that shown in Fig. 1 and by dotted lines in Fig. 2, the sleeve 18 is retracted against pressure of the spring 19.

The hinged jaw 15 is provided with an arm 24 which is loosely connected with the sleeve 18 by a link 25 hinged on said arm and having a loop 26 forming a slot through which passes a stud 27 preferably forming one end or leg of an elongated staple 27ª, the other end or leg 27ᵇ of which is engaged with the rod 23, each leg being attached rigidly to the sleeve 18.

The operation of the device is as follows: When the jaws are closed upon a fruit, as shown by Fig. 2, the lower end of the link 25 is separated from the stud 27 so that a partial retraction of the sleeve 18 is permitted before the jaw is retracted. A downward movement of the lever 16, from the position shown by full lines in Fig. 2, causes the retraction of the sleeve 18, unaccompanied by movement of the jaw 15, until the stud 27 reaches the lower end of the slot 26. A continuation of the downward movement of the lever 16 then causes the outward movement or retraction of the jaw 15 through the stud 27, link 25, and arm 24, the jaw 15 being thus moved outwardly to permit the entrance of a fruit between it and the jaw 13. The jaw 15, which is now held by the operator in its open position, is moved to one side of the fruit to be picked, the latter hanging by its stem between the two jaws. The operator next relaxes pressure on the lever 16, thus permitting the spring 19 to project the sleeve 18 upwardly.

When the stops 22 reach the end portions 15ᵈ of the swinging jaw, they act on said end portions to swing the jaw inwardly toward the fixed jaw and at the same time prevent outward swinging movement of the jaw 15, so that the fruit is securely grasped by the two jaws, and cannot be released accidentally. In case the size of the fruit is such that it permits the meeting of the two jaws, as represented by Fig. 2, the sleeve 18 is projected by the spring until the inner ends of the slots 21 bear on the hinge pintles or ears 15ᵉ, as shown by full lines in Fig. 2. In case the fruit is of larger size, preventing the complete closure of the jaws, the sleeve 18 is projected to a lesser extent, as shown by Fig. 4, the jaw 15 being locked, however, against outward movement by the said stops.

It will be seen from the foregoing that I have provided jaw-operating mechanism including automatic means for preventing the release of the fruit by the jaws, said mechanism being embodied in the sleeve 18, the stops 22 thereon, and the spring 19, and manually-operated means embodied in the lever 16, the rod 23 connecting said lever with the sleeve and the loose connection between the sleeve and the jaw 15 for successively making said automatic means inoperative and causing the jaws to release the fruit.

While the spring 19, acting through the sleeve 18 and stops 22, may be relied on to force the swinging jaw toward the fixed jaw, I prefer to supplement the action of said spring by another spring 29 connected at its ends with the two jaws, as shown, and adapted to pull the hinged jaw toward the fixed jaw.

When the picker is used with soft fruits, such as peaches or pears, the jaw 13 is preferably provided with means for yieldingly supporting a fruit inserted in it to prevent injury to the fruit. This result is accomplished in the embodiment of the invention here shown by yielding members 30, preferably light spiral springs, which are applied to the jaw 13, as clearly shown by Figs. 1 and 2, these members constituting in effect the bottom of the basket formed by the jaw 13.

It is obvious that various changes may be made in the mechanical construction of the device without departing from the spirit of the invention, and that any suitable materials may be employed in its construction.

The spring 29 also serves to prevent loose swinging movement of the jaw 15 when it is unlocked, as shown by Fig. 1, the spring constantly exerting a pull on the said jaw tending to move it inwardly toward the jaw 13, so that the jaw 15 is held against loose movement whether fully or partially opened.

It is obvious that any desired number of yielding members 30 forming the bottom of the basket-jaw may be employed. If desired, the said members may be applied directly to the frame member 13ª, as shown by Fig. 5, the members 13ᵇ and 13ᶜ being omitted. In either case the basket-jaw is composed of a relatively stiff marginal frame portion and yielding members extending crosswise of the frame portion and collectively forming a bottom adapted to yieldingly support a fruit introduced into said frame portion.

Among the advantages of my improved fruit picker are the following:—

First, the picker can be operated among the thick foliage and limbs of a tree to grasp and detach a fruit, no matter what position it occupies on the tree. All pickers heretofore made, so far as I am aware, will only take the fruit that hangs free and clear on the outer portions of the limbs.

Second, the picker is adapted to securely confine and grasp a fruit large or small in detaching it from the tree.

Third, in picking fruit having a tough stem, a combined twisting and pulling strain is required to sever the stem. This strain can be applied by my picker when the jaws are locked while grasping the fruit, and cannot be applied by any other picker of which I am aware.

The stops 22, when in either of the positions shown by Figs. 2 and 4, act to positively limit the movement of the jaw 15 away from the jaw 12 so that a fruit interposed between said jaws is positively confined and cannot cause the separation of the jaws when a pulling and twisting strain is exerted on the picker to detach the fruit. The stops 22, located on the sliding sleeve 18, connected as described with an operating member such as 16 at the inner end of the pole, are operable from the inner end of the pole to release the jaw 15 and permit the discharge of the fruit, hence, the operator is enabled after picking a fruit to lower the pole and discharge the fruit into a receptacle without changing the position of his hands on the pole, or in other words, without moving the pole inwardly until its outer end portion on which the jaws and the stops 22 are located, are within reach of his hands.

I am aware that a fruit picker having separable jaws on the outer end of the pole has been provided with means for positively locking said jaws in their closed relation, as shown by Letters Patent of the United States, No. 57,731. In this patent, however, the locking means are not operable from the inner end of the pole, consequently, the operator after picking the fruit has to apply his hands to the locking means in order to release the fruit, this operation involving considerable loss of time.

I am also aware that it is not new to provide a fruit picker having a jaw affixed to the outer end of a pole and another jaw hinged thereto, the hinged jaw being yieldingly closed by a spring and adapted to be opened by a cord extending from the hinged jaw to the inner end of the pole so that the hinged jaw is operable from the inner end of the pole to release the fruit, as shown by Letters Patent of the United States, No. 358,776. In the device of this patent, however, the jaws are yielding and not positively closed on the fruit so that they are liable to be separated by a pulling and twisting strain on the fruit before the latter is detached from the tree.

It will be seen that my improved picker combines the advantages of the pickers shown by the patents above mentioned and has none of their disadvantages.

I claim:—

1. A fruit picker comprising an elongated rod or handle, a pair of jaws mounted on the outer end portion thereof and formed to bear on opposite sides of a fruit and hold the same while removing it from the tree, the jaws being relatively movable to grasp and release the fruit, jaw-operating mechanism having automatic means for positively preventing the separation of the jaws and the release of the fruit, and manually operated means for successively making said automatic means inoperative and separating the jaws to cause the release of the fruit, said means being operable from the inner end portion of the rod.

2. A fruit picker comprising an elongated rod or handle, a pair of jaws mounted on the outer end portions thereof and formed to bear on opposite sides of a fruit and hold the same when removing it from the tree, one of said jaws being affixed to the handle and the other hinged thereto, and mechanism for moving the hinged jaw toward and from the fixed jaw, to cause the jaws to alternately grasp and release a fruit, said mechanism having automatic means for positively preventing an outward or releasing movement of said hinged jaw, and manually operated means for successively making said automatic means inoperative and causing an outward movement of the hinged jaw, said means being operable from the inner end portion of the rod.

3. A fruit picker comprising an elongated rod or handle, a pair of fruit-grasping jaws mounted thereon, one of said jaws being affixed to the handle and the other hinged thereto, a spring-pressed sleeve movable on the handle and provided with stops which engage the hinged jaw to prevent outward movement thereof when the sleeve is projected, and manually operated means for successively retracting the sleeve and the hinged jaw to first remove the stops from engagement with the hinged jaw and then separate the latter from the fixed jaw.

4. A fruit picker comprising an elongated rod or handle, a pair of fruit-grasping jaws mounted thereon, one of said jaws being affixed to the handle and the other hinged thereto, a spring-pressed sleeve movable on the handle and provided with stops which engage the hinged jaw to prevent outward movement thereof when the sleeve is projected, an operating lever hinged to the handle, and connections between said lever, the sleeve and the hinged jaw, having provisions for retracting said sleeve and jaw successively to first remove the stops from the hinged jaw and then separate the latter from the fixed jaw.

5. A fruit picker comprising an elongated rod or handle, a pair of fruit-grasping jaws mounted thereon, one of said jaws being affixed to the handle and the other hinged thereto, a spring-pressed sleeve movable on the handle and provided with stops which engage the hinged jaw to prevent outward movement thereof when the sleeve is projected, an operating lever hinged to the handle, a rod connecting the lever with the sleeve, said lever and rod being adapted to retract the sleeve to remove the stops from the hinged jaw, an arm attached to said jaw, and a loose connection between the sleeve and the jaw arm, whereby the jaw is retracted after the retraction of the sleeve.

6. A fruit picker comprising a rod or handle and fruit-grasping jaws thereon, one of said jaws being formed as a basket having a yielding bottom for yieldingly supporting one side of a fruit therein, and the other jaw being formed to bear on the opposite side of the fruit and press the same against the said yielding bottom.

7. A fruit picker comprising a rod or handle and fruit-grasping jaws thereon, one of said jaws being formed as a basket and including a relatively stiff marginal frame constituting the mouth of the basket and adapted to receive a fruit, and yielding members attached at their ends to said frame and extending crosswise thereof and constituting a bottom adapted to yieldingly support one side of a fruit introduced into the basket, and the other jaw being formed to bear on the opposite side of the fruit and press the same against said members.

In testimony whereof I have affixed my signature, in presence of two witnesses.

CHARLES F. FELLOWS.

Witnesses:
  GEO. F. SNOW,
  JAMES A. BEEK.

---

Copies of this patent may be obtained for five cents each, by addressing the "Commissioner of Patents, Washington, D. C."